(12) United States Patent
Jung

(10) Patent No.: US 7,413,233 B1
(45) Date of Patent: Aug. 19, 2008

(54) VEHICLE SUN VISOR WITH AUTO-SHADING PROMPTER SCREEN

(76) Inventor: Man-Young Jung, 2750 E. Washington Blvd., Suite 150, Pasadena, CA (US) 91107

( * ) Notice: Subject to any disclaimer, the term of this patent is extended or adjusted under 35 U.S.C. 154(b) by 0 days.

(21) Appl. No.: 11/897,184

(22) Filed: Aug. 28, 2007

(51) Int. Cl.
*B60R 3/00* (2006.01)
(52) U.S. Cl. ...................................... 296/97.7
(58) Field of Classification Search ........... 296/97.1, 296/97.2, 97.6, 97.7
See application file for complete search history.

(56) References Cited

U.S. PATENT DOCUMENTS

| | | | | |
|---|---|---|---|---|
| 4,352,519 A * | 10/1982 | Aro | ............................ | 296/97.6 |
| 5,296,678 A * | 3/1994 | Schnorf | ...................... | 296/97.1 |
| 5,535,808 A * | 7/1996 | Idesis et al. | ................. | 296/97.7 |
| 6,760,461 B2 * | 7/2004 | Azima et al. | ................ | 296/97.1 |
| 6,959,956 B1 * | 11/2005 | Fero et al. | ................... | 296/97.1 |
| 7,017,970 B2 * | 3/2006 | Weinberger | ................ | 296/97.6 |
| 2006/0113818 A1 * | 6/2006 | Ferguson | .................... | 296/97.6 |
| 2007/0126255 A1 * | 6/2007 | Mitsui | ........................ | 296/97.2 |

* cited by examiner

*Primary Examiner*—Lori L Lyjak
(74) *Attorney, Agent, or Firm*—Clement Cheng (57) ABSTRACT

A tandem sun visor and display are combined for providing shading and transparent driving prompt image in a vehicle to the operator in control. The sun visor comprises an opaque and elongated sun visor member horizontally mounted about two pivot axes above the operator in the vehicle to block the direct sunlight from the upper front or upper side of the operator, a transparent LCD display that doubles as an electronic sun visor and a swivel mount for pivotally positioning the LCD display in front of the vehicle driver. The shade can be tuned so that the operator can see the environment as well as GPS map, messages or vehicle operational data.

20 Claims, 9 Drawing Sheets

VEHICLE SUN VISOR WITH AUTO-SHADING PROMPTER SCREEN

BACKGROUND OF THE INVENTION

A. Field of the Invention

The present invention relates to a vehicle interior accessory. More particularly, the present invention relates to LCD auxiliary sun visors and their mounting means for electromechanically connecting such LCDs to existing sun visors or dashboard top.

B. Description of the Prior Art

In addition to conventional gauges like speedometer, tachometer, fuel and temperature gauges, newer vehicles present ever increasing operational information through the instrument panel indicators generally facing the driver through the steering wheel. For example, in a mini van model the LED indicators alone count to twenty eight or so though part of them will be turned on any one time requiring the driver's attention while driving. Driving in rain or direct sun light, discussing with passengers or a phone caller and/or reading a paper map are known distractions many vehicle drivers experience, as with trying to follow the new navigator LCD displays for showing the vehicle's changing driving locations with reference to the moving street names on LCD displays. Due to the crowded display space in the vehicle dashboard, the LCD displays must be positioned in the center fascia out of the line of sight of the driver. Normally tight tolerance to the front viewing area for the driver prohibits an additional blocking of views by such a navigation display even though it assists the driver in timely steering the vehicle. New displays are emerging such as a liquid crystal windshield display wherein a vehicle windshield itself is a liquid crystal display for playing semi-transparent graphics as suggested by U.S. Pat. No. 5,920,363 to Rofe. Current advancements in electronic data processing make use of conventional video display to show actually photographed scenes of roads superimposed with additional graphic information. Besides the liquid crystal windshield display, Heads Up Displays or HUD has been tried for applications in public use for some time. HUD beams an image from a dashboard-mounted projector to the windshield so that the driver safely keeps the eyes on the front road conditions with fewer distractions. The images may be a prerecorded video file or live video feeds from an onboard camera at the rear of the vehicle to monitor the backward area for any hazards. However, in order to apply the display advancement the major renovation is required to dismantle the permanent vehicle windshield which is performed only by professional windshield technicians.

There have been attempts to utilize existing convenience devices for additional displays of driving information. It has been suggested to designate a limited portion of the interior rear view mirror for transforming it between a reflective mirror surface and a transparent screen area with the use of a transflective coating on the rear view mirror to hide the LCD display normally but showing it temporarily when the vehicle is in the reverse gear. Others offered passenger-side sun visor replacements that can play a video for the front occupants to watch although driving with diverted attention from the traffic may be seriously compromising the safety of the entire passengers of the vehicle and others.

Therefore, it is necessary to have a simple display method of driving information for the driver in a safe way.

Other efforts to bring displayed information closer to the driver's line of sight include U.S. Pat. No. 5,971,468 to King suggesting an incorporation of vehicle display into vehicle sun visor where a sun visor is lowered to reveal a digital display panel.

In view of the foregoing, an object of the present invention is to provide a transparent display panel for use in a vehicle that doubles as an auxiliary sun visor with electronically controlled shading for an optimum protection against harmful lighting conditions.

SUMMARY OF THE INVENTION

According to the present invention, a tandem sun visor and display are combined for providing shading and transparent driving prompt image in a vehicle to the operator in control. The sun visor comprises an opaque and elongated sun visor member horizontally mounted about two pivot axes above the operator in the vehicle to block the direct sunlight from the upper front or upper side of the operator; a transmitter fixed to the vehicle for relaying vehicle operational information from an onboard processor and/or a satellite global positional output of the vehicle in a video format signal; an auxiliary shade member of transflective liquid crystal display extending in parallel with the sun visor member for receiving the video format signal to display a mid-air image of the vehicle operational and positional information in front of the operator with the aid of an external ambient light filtered through the shade member into the vehicle interior in place of a backlighting device; and a swivel mount for pivotally positioning the LCD display in front of the vehicle driver.

Embodiments of the invention will now be described by way of example with reference to the accompanying drawings.

BRIEF DESCRIPTION OF THE DRAWINGS

Similar reference numbers denote corresponding features throughout the attached drawings. The drawings show a variety of embodiments, the elements of which could be combined with other embodiments, or could be used alone.

DETAILED DESCRIPTION OF THE PREFERRED EMBODIMENT

Figure 1:
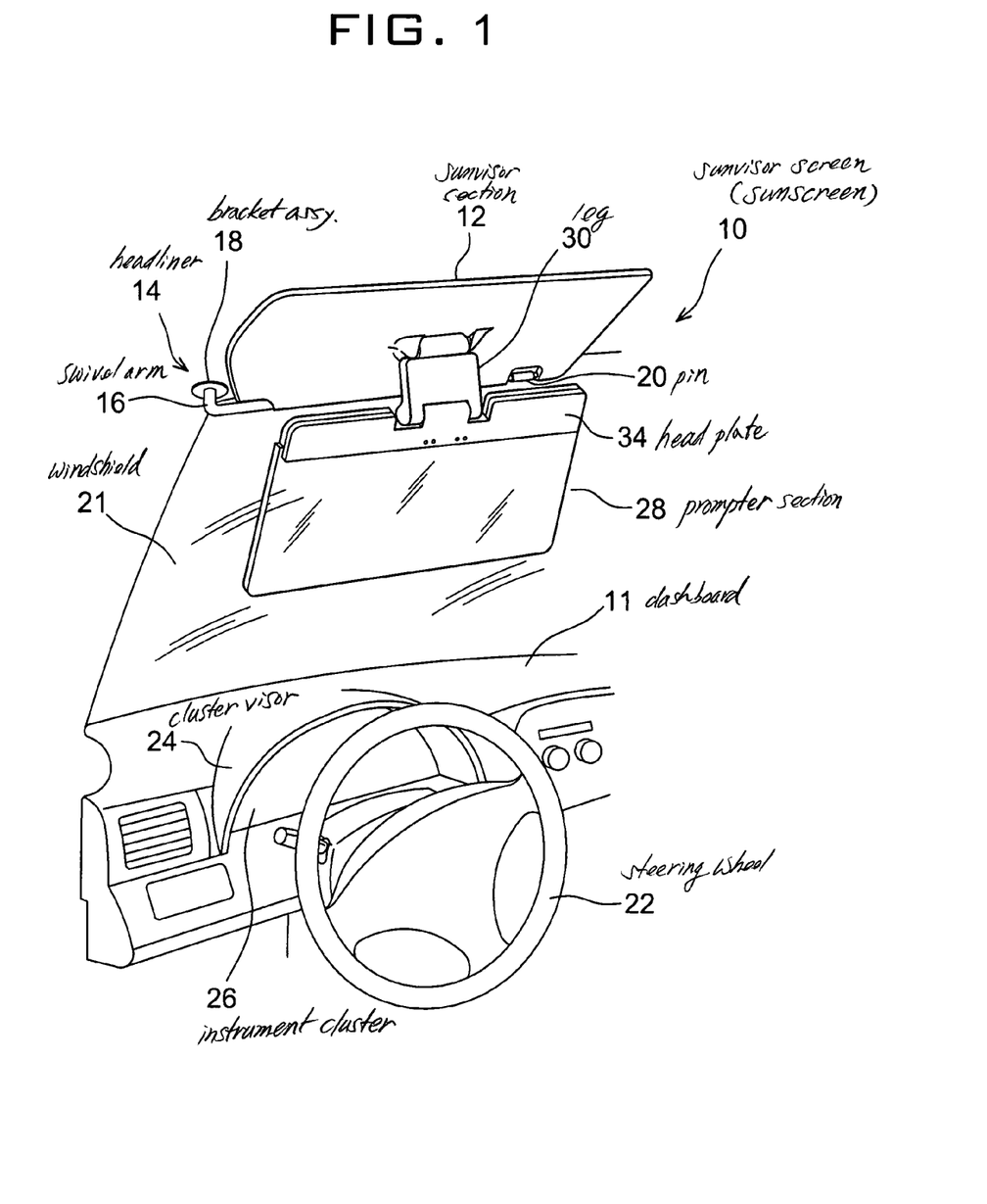
FIG. 1 is a perspective view of a tandem sun visor screen in a vehicle interior with the LCD screen section being deployed from the stowed visor section according to a first embodiment of the present invention.

With reference to FIG. 1 illustrating a part of an automobile cabin, a vehicle tandem sun visor screen or sunscreen 10 of the first embodiment of the present invention may be installed above a dashboard 11 and has a sun visor section 12 mounted on a headliner 14 of the cabin interior by a swivel arm 16. Making sun visors is well known by many including U.S. Pat. No. 7,025,399 wherein a modern sun visor model is disclosed as comprising a Kraft paper foundation, a sturdy frame of plastic and the like defining round edges, soft pad, cloth cover, and a pivoting rod for adjustably holding the sun visor foundation onto a vehicle headliner for the purpose of providing a piece of shade for the vehicle driver or a passenger to block the direct sunlight through the front windshield and side window.

As in conventional designs, a bracket assembly 18 mounts swivel arm 16 of sun visor section 12 to vehicle headliner 14 near the driver side's upper corner. Also formed in the sun visor section 12 is a pin 20 that may be pushed into a fixed clip (not shown) for holding sun visor 12 in a stowed position lying flat on headliner 14. Although not shown, a similar sun visor may be symmetrically installed at the side of the front passenger. As is customary in a vehicle structure, the cabin also holds a windshield 21, a steering wheel 22, a cluster visor 24 on dashboard 11, an instrument cluster 26 for displaying the current status of the vehicle such as speed, fuel level and others.

A prompter section 28 of sunscreen 10 of the present invention may be made of a transparent flat panel display based on a liquid crystal display or LCD element in a size to fit within sun visor 12 when they are folded flat onto each other. The LCD element may display video information by transparent pixels (picture elements) so that the background can be seen. The active prompter section 28 of the first embodiment is adapted to move in unison with the passive sun visor section 12 as they may be folded and unfolded with respect to each other though a folding leg 30.

The LCD element may be a blank LCD plate having a transparent protective cover layer less the conventional opaque backlighting layer so that the vehicle operator may see through the LCD element the ambient light from inside the vehicle cabin, which is almost always dark relatively. Alternatively, an organic light emitting diode or OLED display may be used for prompter section 28. In order to show their positional relationship well, prompter section 28 is depicted when it is just being spread from the exterior surface of sun visor section 12, which is still in a stowed position. In any case, the display should be able to be tuned in darkness and lightness so that the operator will receive optimum shading, or lack thereof. In any case, there are a wide variety of his ways that can provide shade that can be tuned so that the operator can see the environment as well as GPS map, messages or vehicle operational data.

Figure 2:
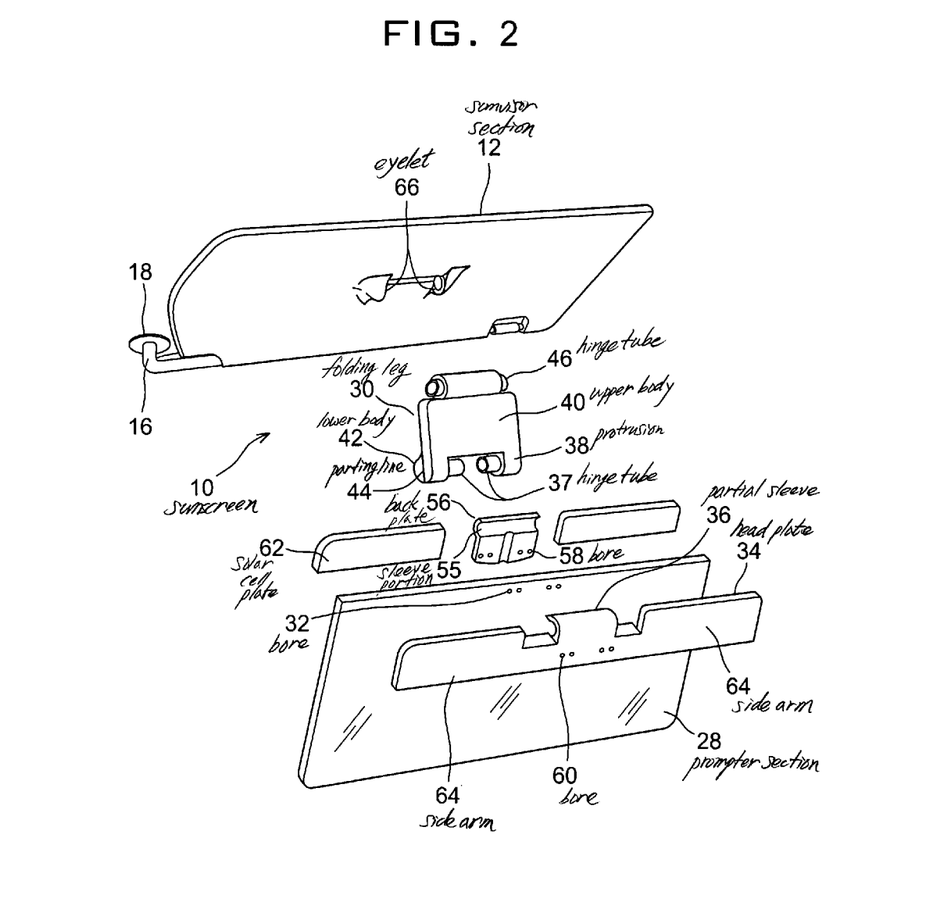
FIG. 2 is a partially exploded perspective view of the major components of the sun visor screen of FIG. 1.
Figure 3:
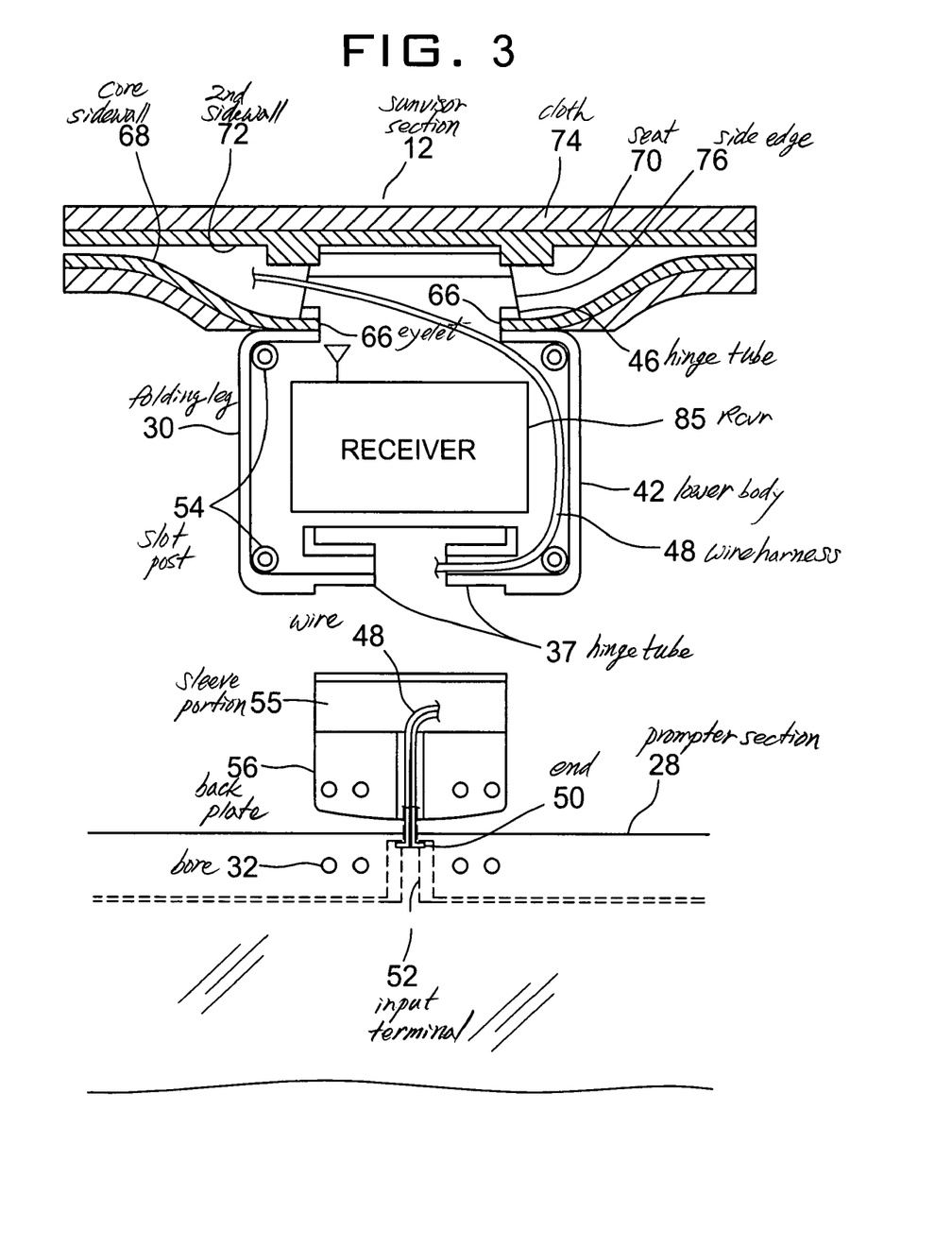
FIG. 3 is a partially exploded view of a bracket for mounting the LCD screen on the sun visor section showing the electrical leads to connect the terminals of the sun visor and screen sections through articulated joints.
Figure 4:
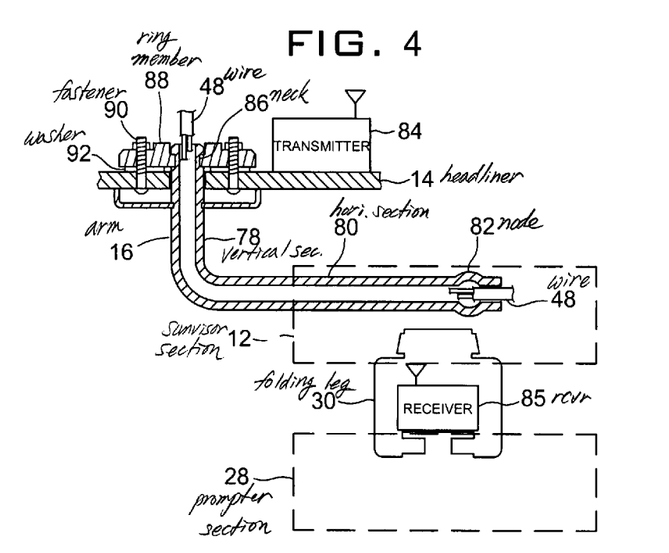
FIG. 4 is a cross sectional enlarged view of a pivot arm for mounting the sun visor section to the headliner of the vehicle.

Referring to FIGS. 2-4, a head plate 32 may be first attached to the top edge of prompter section 28 by provisional spot heat bonding or gluing before it is permanently affixed to prompter section 28 through multiple bores 32 by screws, not shown. In its top center, head plate 34 has a partial sleeve 36 that hooks over two opposing hinge tubes 37 formed at lower protrusions 38 of leg 30. Folding leg 30 may be formed into a hollow structure consisted of an upper body 40 and lower body 42 with a longitudinal parting line 44 running laterally between bonding surfaces. Folding leg 30 also has at its tubular top end two opposite hinge tubes 46 formed partly integral to upper and lower bodies 38, 40, respectively. Referring particularly to FIG. 3 where head plate 34 and upper body 40 of leg 30 have been removed, wire harness 48 may be inserted into one of lower hinge tubes 37 and exited from upper hinge tubes 46 in a concealed manner so that folding leg 30 connects prompter section 28 to sun visor section 12 electrically as well as mechanically. Wire harness 48 may include conventional power lines to energize an illuminator in connection with a convenience mirror installed on sun visors. Ends 50 of leads 48 are connected by soldering or other welding methods to input terminals 52 of prompter section 28 in order to supply the visual signals for operating the LCD element in this embodiment. In addition, lower body 42 of folding leg 30 has four slot posts 54 at the corners to which corresponding pins on upper body 40 are secured during assembly.

A back plate 56 is adapted to mate head plate 34 at its partial sleeve 36 engaging hinge tubes of leg 30 and has a complementary sleeve portion 55 adapted to form a complete sleeve closed around lower hinge tubes 36 to have an articulated joint with a tight grip between folding leg 30 and prompter section 28. Adding annually arranged teeth along the outer surfaces of the sleeve of back plate 54 and a checking protrusion on the side of leg 30 will enhance the gripping force between them. Back plate 56 also has multiple bores 58 formed at corresponding positions to bores 32 of prompter section 28 to secure back plate 56 to section 28 using fasteners, which are threaded through bores 58, 32 and similar bores 60 formed in head plate 34. Then, the hinged prompter assembly may be mounted onto sun visor section 12.

Solar cell plates 62 may be positioned on the top edge of prompter section 28 and attached to side arms 64 of head plate 34 taking the positional advantage of this sun visor facing the sunlight during operation thereby producing the required electric energy for prompter display. In between solar cell plates 62 a light sensor may be mounted for connection to an LCD driver circuit that is located in folding leg 30 to add or subtract variable degrees of electric shading with changing background signals with respect to the current weather condition to maintain an appropriate filtration of incoming sunlight as well as the optimum transparency of the visual display projected on prompter section 28.

To receive folding leg 30 of the prompter assembly, sun visor section 12 has two raised eyelets 66 positioned centrally of its front surface, which will face the vehicle operator in the stowed position and the sunlight when it is swung open outwardly. Eyelets 66 may be made by shaping a first core sidewall 68 of a plastic material for structurally supporting sun visor section 12 to have semicircular lateral openings and by forming an opposing seat 70 on a second sidewall 72 folded over first sidewall 68 as shown in FIG. 3. Core sidewalls 68, 72 may be finished with a cover cloth 74.

In order to facilitate the insertion of hinge tubes 46 of folding leg 30 into eyelets 66, hinge tubes 46 are tapered distally. Once pressed into eyelets 66 along slanted side edges 76, hinge tubes 46 and thus prompter section 28 are firmly attached to the vehicle interior through the double articulating joints of folding leg 30 and the swivel connection of sun visor section 12. Adding annually arranged teeth along the round end surfaces of leg 30 between hinge tubes 46 and forming a checking protrusion on the opposing seat 70 in sun visor section 12 will enhance the gripping force between them.

FIG. 4 shows in cross section the mounting of swivel arm 16 on headliner 14. Arm 16 is an L shaped tube having a vertical section 78 protruding through headliner 14 and a horizontal section 80. Arm 16 may be made of a plastic material reinforced with a tubular metal core to support the weights of sun visor 12 and prompter 28 sections. Horizontal arm section 80 extends deep into sun visor section 12 and held therein by an appropriate bracket to permit sliding adjustment of sun visor screen 10 to suit the need of the user. To prevent disengagement of sun visor screen 10, a node 82 is formed on arm 16 near its distal end.

Besides wire 48, a radio transmitter 84 may replace the physical conductor to supply the operational data to the LCD section 28 allowing section 28 for a freedom of location from being tethered to the body of sun visor section 12. A receiver 85 paired to transmitter 84 may be positioned inside folding leg 30 or other similar pivoting structure that is necessarily attached to prompter section 28 in another embodiment of the present invention.

Figure 5:
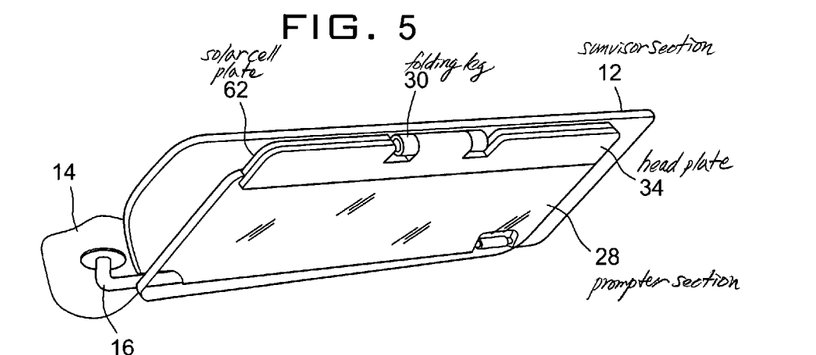
FIG. 5 is a perspective view of the sun visor screen moved out of sight of the vehicle operator with the screen in a stowed position on the retracted sun visor.
Figure 6:
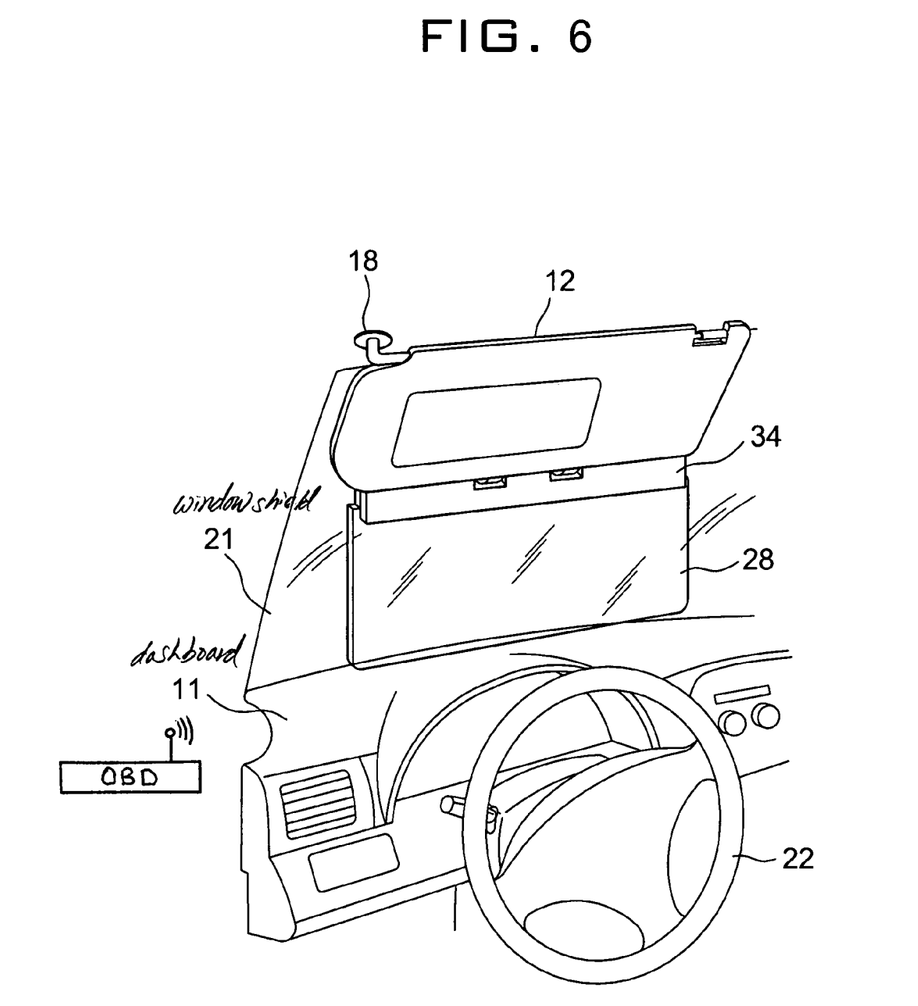
FIG. 6 is a perspective view of the sun visor screen showing the tandem sun visor screen fully deployed to block and filter the sunlight and provide mid-air visual information to assist the operation of the vehicle.

Top end of arm 16 has a neck portion 86 that extends above headliner 14 and is held by a ring member 88 fixed by fasteners 90 through washers 92 to headliner 14 so that arm 16 is limited to move about vertical section 78. Thus, the user may rotate sun visor screen 10 between the front and side edges of headliner 14. At the same time, screen 10 may be stowed flat on headliner 14 away from blocking the windshield as shown in FIG. 5 wherein sun visor 12 and prompter 28 sections are completely folded within each other's area and virtually flush with headliner 14. Conversely, when deploying sun visor screen 10 to the full extent, the user may pull down screen 10 by grabbing leg 30 into the position illustrated in FIG. 6. Here, the vehicle operator may see through prompter 28 to gain valuable information without distracting the primary attention from the road ahead. Due to the positional freedom of prompter section 28 with respect to sun visor section 12, the user may have a wide variety of choices with sun visor screen 10 between the configurations shown in FIGS. 5 and 6.

For example, prompter 28 alone may be articulated into the operational position in front of the driver with sun visor 12 in its stowed position. According to the ambient condition surrounding the vehicle such as the intensity of sunlight and its angle of intrusion, the user may easily set the three-dimensional position of prompter 28 and thus its display mid-air virtually anywhere in the cockpit. And with prompter 28 staying flat on sun visor 12 only the sun visor 12 will appear to the operator as it blocks the sunlight from reaching inside the vehicle. In short, prompter 28 may be swiftly moved by the operator up and down and fore and aft before it is readily locked in the best position to prompt the operator with semi-transparent vehicle data from GPS navigator, speedometer, tachometer, fuel and temperature gauges, or the entire car instrument panel may be projected near the windshield.

Figure 7:
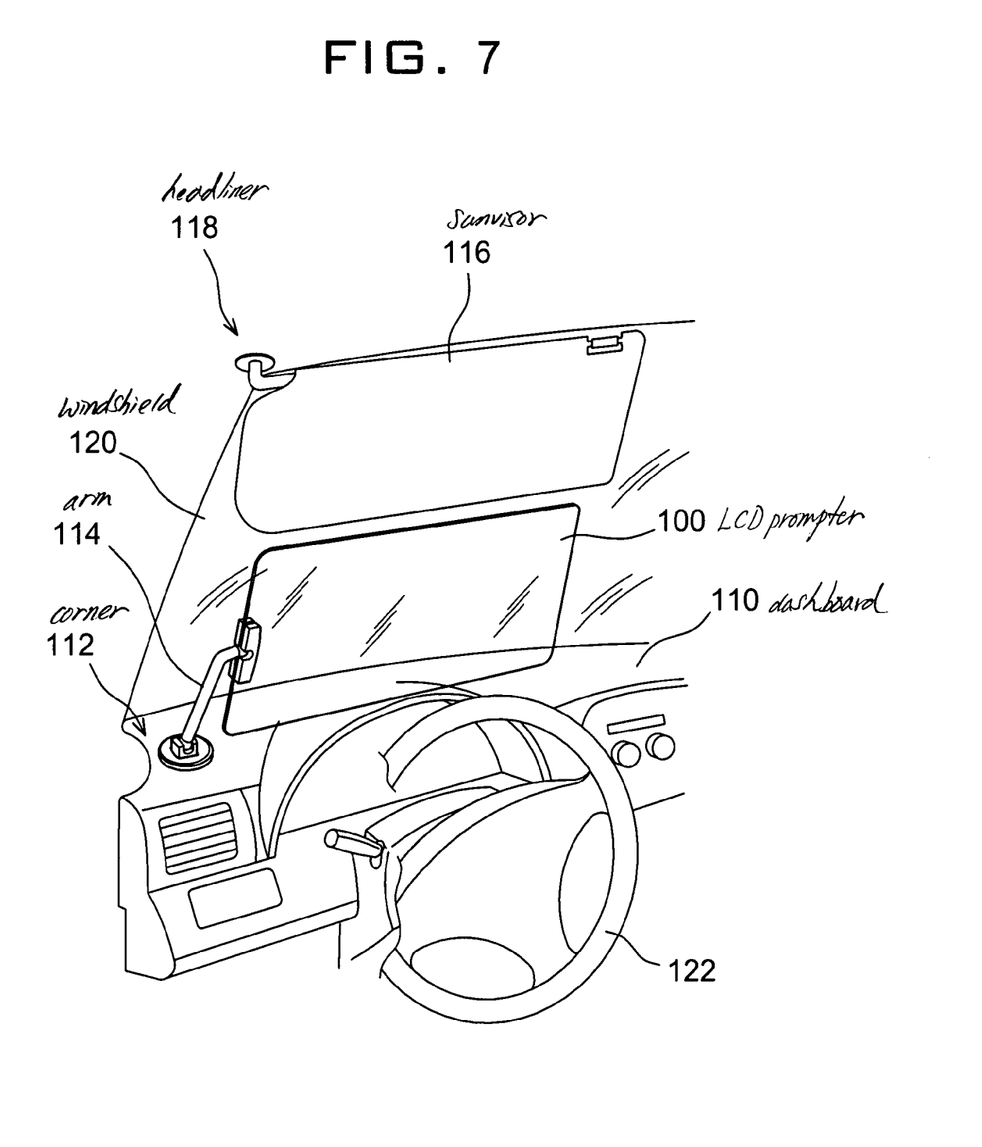
FIG. 7 is a perspective view of a tandem sun visor screen with the LCD screen section being pivotally mounted in parallel with the visor section on ball joints of an arm erected from the dashboard according to a second embodiment of the present invention.

FIG. 7 illustrates an alternative mounting method of the present invention wherein an LCD prompter 100 as an aftermarket system is installed on a dashboard 110 of a vehicle product without the heads-up display option. Semitransparent prompter 100 may be located near a driver side corner 112 by a side arm 114 to provide a functional sunshade that assists an existing sun visor 116 depending from a headliner 118 to optimize the lighting condition for the safest vehicle driving possible. Besides filling the uncovered space by sun visor 116, prompter 100 receives various operational information to turn it into a transparent visual effect across the space between windshield 120 and the operator behind a steering wheel 122. Side arm 114 is adapted to hold prompter 100 in numerous effective positions due to its double articulation structure.

Figure 8:
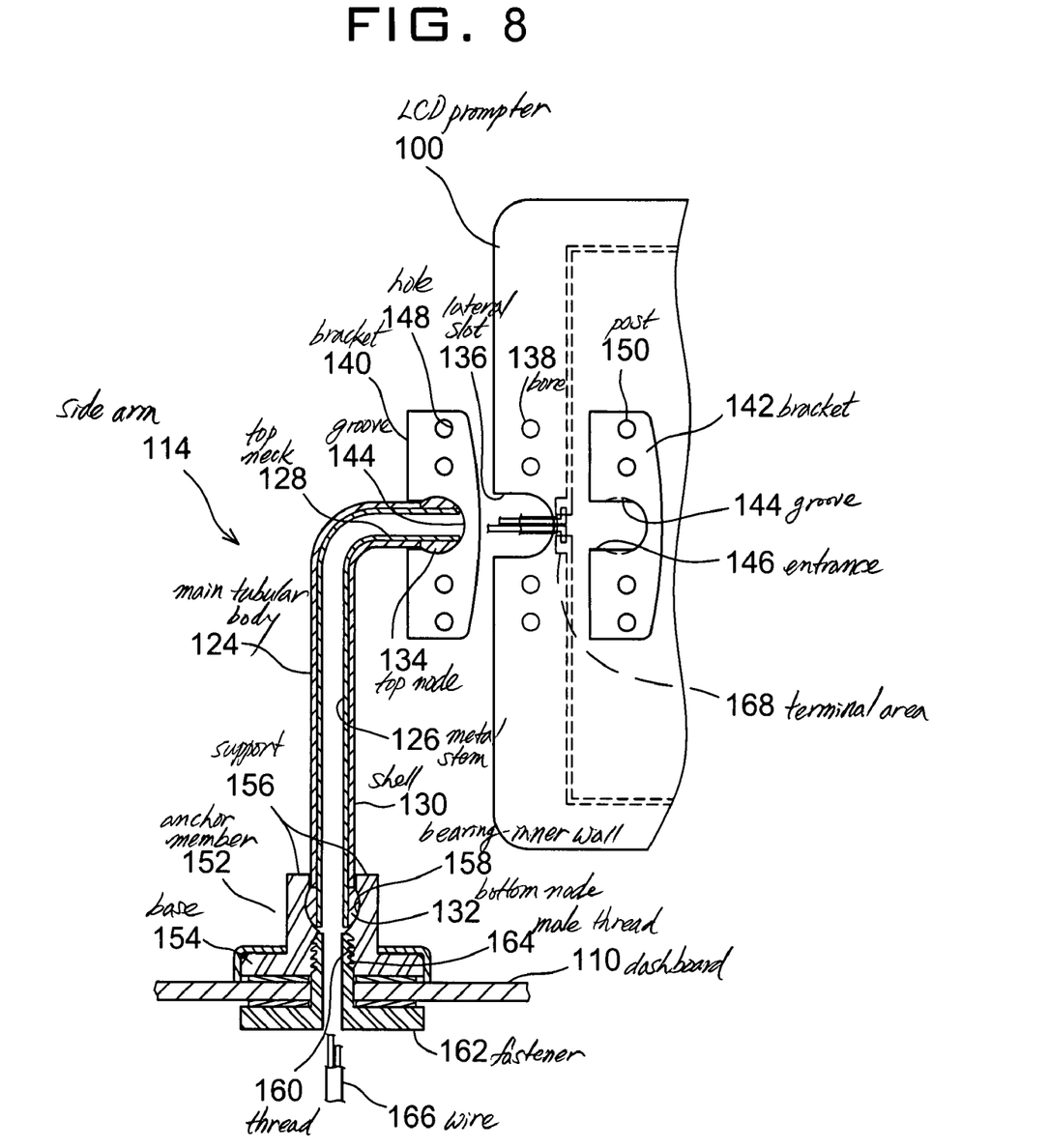
FIG. 8 is a partial cross sectional view of the sun visor screen of FIG. 7.

Referring further to FIG. 8, side arm 114 has a main tubular body 124, which may comprise a longer metal stem 126 bent near its top neck portion 128 and an outer shell 130. Shell 130 may have a bottom bearing node 132 and a top node 134 to be caged respectively for providing limited swivel movements, which when combined, allow a wide range of adjustments of the prompter position.

Prompter 100 may be cut to form a lateral slot 136 for receiving a part of top node 134 and a number of bores 138 to have top node 134 pivotally attached thereto using a couple of bracket members 140, 142. Bracket members 140, 142 may be made of a plastic material in the form of thick strips each having a large central groove 144 to engage a lateral spherical part of top node 134 and a narrow entrance 146 for grasping neck portion 128. Two opposing bracket members 140, 142 will sandwich top node 134 of arm 114 and the proximal side edge of prompter 100 together. To make a permanent pivot hold of the prompt 100, bracket member 140 may have holes 148 at corresponding locations to bores 138 of prompter 100 and bracket member 142 is provided with posts 150, which penetrates bores 138 and holes 148 before they are thermally riveted to make a mechanical lock. As a result, prompter 100 is limited to pivot about the axis of tubular neck 128 over top node 134 within a predetermined range of angular positions, for example 90 degrees in both clockwise and counterclockwise directions.

On the other hand, bottom node 132 of side arm 114 is pivotally mounted to an anchor member 152 having a wide base 154 and two parallel supports 156 for cooperatively forming ball bearing inner walls 158 for clipping node 132 with a firm grip. Under bearing walls 158 is formed a female thread 160 to which a hollow fastener 162 with a male thread 164 is tightened through the wall of dashboard 110. Therefore, arm 114 is restricted from falling sideways but permitted to rotate about the axis of main tubular body 124 of arm 114 as it pivots fore and aft over dashboard 110. A group of wires 166 carrying electric signals may stem from the vehicle electronic system (not shown) and run through inside of anchor member 152 and side arm 114 to a terminal area 168 of prompter 100 for the sake of a neat cable management.

With combined articulations of arm 114 at its opposite ends prompter 100 can maintain the horizontal posture above dashboard 110 as it swivels between a completely flat position on dashboard 110 and the fully erected position shown in FIG. 7.

Figure 9:
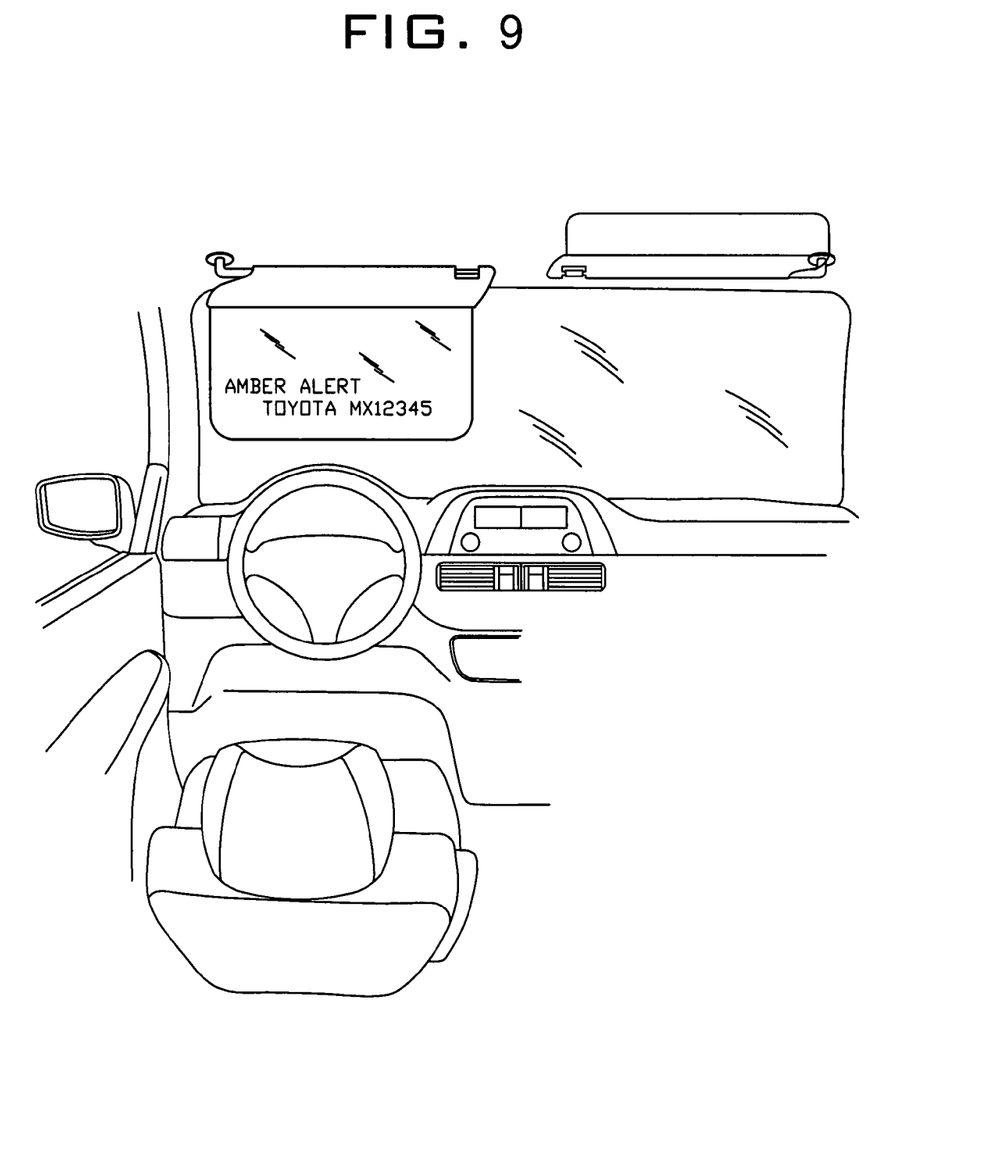
FIG. 9 is a perspective view of the sun visor screen in operation as appeared in the cockpit of the vehicle in relation to the position of the operator.

FIG. 9 is a perspective view of the sun visor screen in operation as seen in the cockpit of the vehicle in relation to the position of the operator. The screen shows a message which is an Amber alert with the make, model and license plate number of a vehicle. A wide variety of messages can be received from the receiver 85 that are shown on the prompter section 28. The prompter section 28 is preferably an LCD screen providing a view of an environment through the prompter 28.

Figure 10:
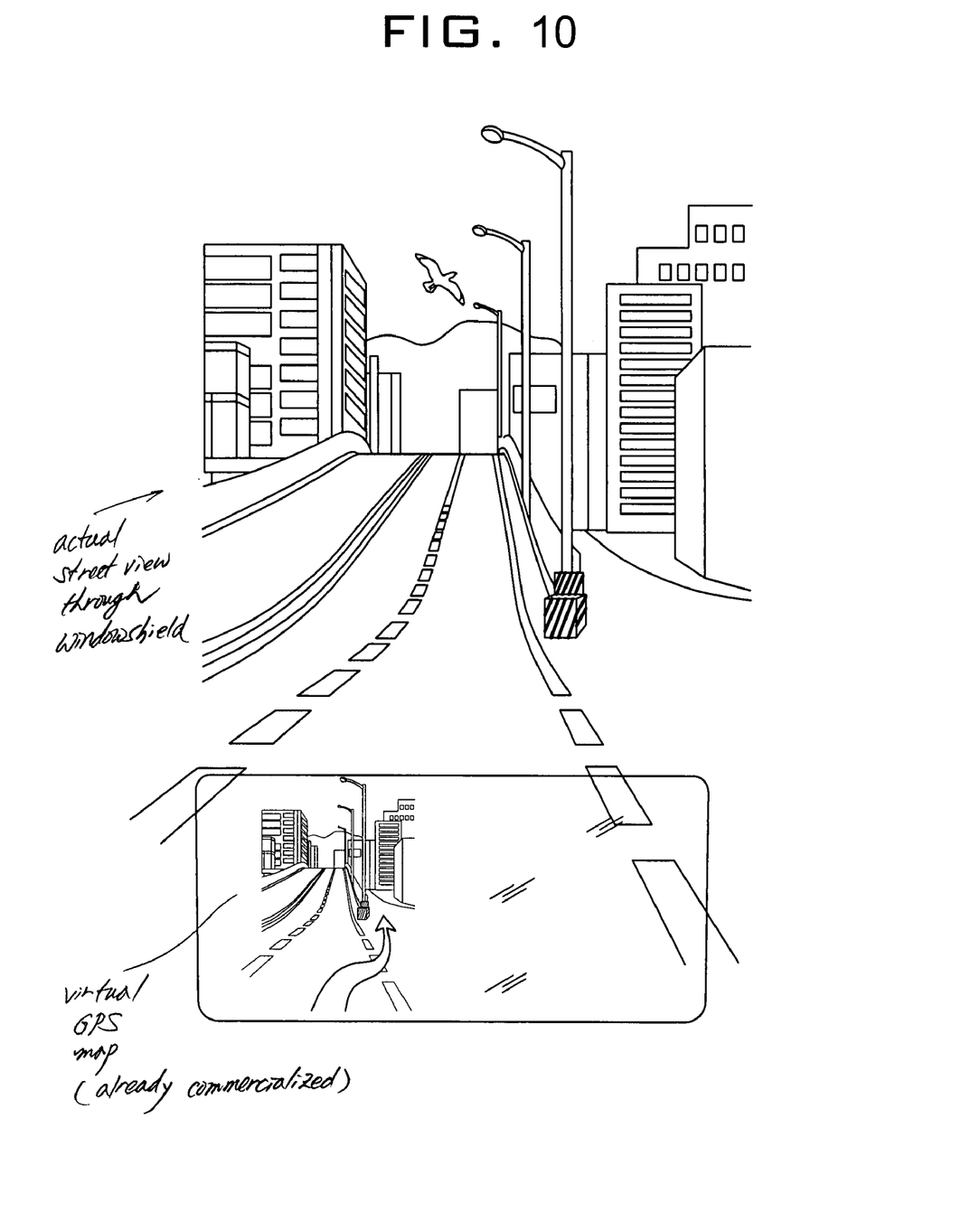
FIG. 10 is a simulated screen display of the current location of the vehicle on the sun visor screen by a connected navigator for conveniently superimposing the real scene with the virtual vision for the intuitive location recognition.

FIG. 10 is a simulated screen display of the current location of the vehicle on the sun visor screen by a connected navigator for conveniently superimposing the real scene with the virtual vision for the intuitive location recognition. When the user looks through the prompter section 28, a graphical layout and depiction of a map of the area can assist the driver with navigation. The main idea of the invention is to provide a superimposed image that can guide the driver while allowing the driver to see the road and environment as well. Therefore, the LCD display prompter section 28 is transparent so that the user can see the environment behind the LCD display prompter section 28. The user compares the environment with the information output on the prompter section 28 allowing the user to have a reality check of the information output. For example, in the figure, the lower section shows what the user should see, the user can correlate the lower section graphic with the upper section actual background environment and the eye will naturally and quickly make a comparison. Thus, having the screen transparent allows the user to instantaneously verify the accuracy of the data output shown on the screen. The arrow shown in the prompt area provides the user with an unambiguous and easily understood direction to change a lane and proceed parallel to the bridge.

A database may be stored in the leg 30 of the device, or in the top frame also called the head plate 32. The database provides road and street information including maps that are then shown on the prompter section 28. Thus, the database operates as an ordinary GPS map database receiving GPS information from the receiver 85. The database thus allows a map and directions output on the prompter section 28 in graphical three-dimensional format. Optionally, the three-dimensional format can be a two-dimensional format with either north up or direction traveling up.

Data from the engine or from any other part of the car can be captured via an OBD port. Data can also be combined from the GPS receiver portion to be combined with the data from the OBD port. Most modern vehicles have an OBD port located under the car hood that can be accessed via a device such as that shown in U.S. Pat. No. 6,112,152 to Tuttle filed Aug. 20, 1999 the disclosure of which is incorporated herein by reference. U.S. Pat. No. 6,112,152 to Tuttle filed Aug. 20, 1999 states the benefits of OBD data, "On-board vehicle computer systems are known in the art. Such systems monitor and control operations of mechanical vehicle systems, including vehicle engine systems, transmission systems, brake systems, suspension systems, and display systems. On-board computer systems receive information from various sensors, such as engine speed sensors, manifold pressure sensors, etc. The on-board computer systems can control systems such as by controlling mixture, fluid flow, etc., by controlling electronic systems, or by controlling solenoid-actuated valves that regulate flow of hydraulic fluid." Tuttle further shows various examples such as U.S. Pat. Nos. 4,875,391; 5,459,660; 5,278,759; DE 3+5 40 599 A1 and U.S. Pat. No. 5,150,690.

Tuttle further explains, "Many vehicles employ several separate microprocessor based computer systems which cooperate with one another. On-board communications systems typically include data busses to enable data communication between such vehicle computer systems. Such data bus technology is disclosed in U.S. Pat. Nos. 4,706,082; 4,719,458; 4,739,323; 4,739,324; and 4,742,349 . . . ." "Such communications systems may employ multiplexing so that simple wire harnesses can be employed for data transmission. In many vehicles, direct access may be provided to monitored data on a real time basis, so that display tools and engine analyzers may be used to perform a more complete diagnosis of engine problems than can be performed by on-board computers. For example, a data terminal connected to an input/output port of the vehicle computer or to an electronic control module may be provided under a dashboard, as described in U.S. Pat. No. 4,853,850 to Krass, Jr. et al. . . . ."

Tuttle also explains, "Because of heavy reliance on on-board computer systems, vehicles presently sold in the United States provide a standardized diagnostic interface according to a 'OBDII/CARB' standards requirement. The OBDII/CARB requirement offers a choice between a J1850 specification and an ISO9141 (International Standards Organization) specification. The OBDII requirement, the J1850 standard, and the ISO9141 specification are incorporated herein by reference. It is also known to use hand held display tools to display code values generated by vehicle computers. Such hand held display tools are described in U.S. Pat. No. 4,602,127 to Neely et al."

Tuttle then offers in the summary of invention, the use of a wireless device to send OBD-II information, "A system comprising a vehicle on-board computer; and a wireless transponder device coupled to the vehicle on-board computer. The system performs a variety of functions because of its ability to transmit and receive data from other transponders which may be remote from the vehicle or located in the vehicle at a location spaced apart from the system. Remote transponders are spaced apart from the vehicle. The remote transponders can be positioned, for example, at a gas station, toll booth, service center, dealership, parking lot, or along a roadside."

In any case, the Tuttle device is widely used in the market place and a variety of OBD connectors can plug into the OBD port under the out of the car. These connectors then can wirelessly transmit a variety of information. The receiver 85 can receive the wirelessly transmitted information and display the wirelessly transmitted information on the display. The shade control is also integrated with the display so that the display changes in darkness depending upon sunlight conditions. The receiver 85 receives operational information such as engine information and forwards the operational information to the prompter 28. The prompter 28 may display relevant operational information, continuously or when preset criteria are met.

With the active shade control capability, the sun visor screen of the present invention may also become an excellent heads-up display surface to project images from portable projectors that are being developed in a size tiny enough to fit in mobile phones and other small electronic products carried onboard to integrate more knowledge into informed vehicle operations in a safety-minded way.

Active shade is implemented on the prompter 28 by adjusting the LCD contrast and brightness controls in response to sunlight so that the prompter section 28 operates as an automobile sun visor. The prompter 28 can also partially operate as an automobile sun visor because it has active LCD control. The LCD can be controlled in response to photo receptive elements such as a solar cell or solar cell plate 62 which is located in the top frame portion of the prompter. The solar cell plate 62 constantly receives the state of the sun light generally available and coming through the windshield 21. The solar cell plate 62 then transmits the amount of solar data to the data processing circuit. The data processing circuit can then adjust the LCD automatically in response to the state of the sunlight through windshield 21. Other light sensors other than the solar cell plate 62 can be used.

Therefore, while the presently preferred form of the sun visor screen has been shown and described, and several modifications thereof discussed, persons skilled in this art will readily appreciate that various additional changes and modifications may be made without departing from the spirit of the invention, as defined and differentiated by the following claims.

The invention claimed is:

1. A vehicle visor display for providing transparent driving prompt with shading in a vehicle for the operator comprising:
   a. a light sensor;
   b. a shade member comprised of a top frame and a display prompter having a transparency wherein the operator can see the windshield through the display, wherein the display is mounted to the top frame, wherein the light sensor provides an ambient light level reading which is used to tune the display darker or lighter in response to sunlight levels, wherein the tuning provides shade for the operator;

c. a receiver receiving vehicle operational data and satellite global positional data;

d. a data output on the display prompter, wherein the data output includes vehicle operational information, vehicle positional information, and messages.

2. A vehicle visor display of claim 1, further comprising a map database and a map and directions output.

3. A vehicle visor of claim 2, further comprising a completely opaque and somewhat elongated sun visor member horizontally mounted about a pivot axis above the operator in the vehicle to block the direct sunlight from the upper front or upper side of the operator, wherein the shade member is mounted to the sun visor.

4. A vehicle visor of claim 3, wherein the shade member is made of a transflective liquid crystal display extending in parallel with the sun visor member for receiving a video format signal to display a mid-air floating semitransparent image of the vehicle operational and positional information in front of the operator with the aid of an external ambient light filtered through the shade member.

5. A vehicle visor of claim 4, wherein the vehicle operational information is received wirelessly from an OBD port.

6. The vehicle visor display of claim 1, wherein the vehicle operational information is received wirelessly from an OBD port on the vehicle.

7. The vehicle visor display of claim 6, wherein the display prompter is an LCD.

8. The vehicle visor display of claim 1, wherein the display prompter is an LCD.

9. The vehicle visor display of claim 1, wherein the display prompter is an OLED.

10. The vehicle visor display of claim 1, further comprising a backlighting device mounted in the top frame.

11. The vehicle visor display of claim 1, further comprising a completely opaque and sun visor member that is elongated and horizontally mounted about a pivot axis above the operator in the vehicle to block the direct sunlight from the upper front or upper side of the operator, wherein the shade member is mounted to the sun visor.

12. The vehicle visor display of claim 11, wherein the shade member is made of a transflective liquid crystal display extending in parallel with the sun visor member for receiving a video format signal to display a mid-air floating semitransparent image of the vehicle operational and positional information in front of the operator with the aid of an external ambient light filtered through the shade member.

13. The vehicle visor display of claim 12, wherein the shade member is swivel mounted for pivotally mounting the shade member to the sun visor.

14. The vehicle visor display of claim 1, wherein the shade member is swivel mounted for pivotally mounting the shade member.

15. The vehicle visor display of claim 1, further comprising a transmitter fixed to the vehicle for relaying vehicle operational information from an onboard processor and a satellite global positional output of the vehicle in a video format signal.

16. The vehicle visor display of claim 15, further comprising a completely opaque and sun visor member that is elongated and horizontally mounted about a pivot axis above the operator in the vehicle to block the direct sunlight from the upper front or upper side of the operator, wherein the shade member is mounted to the sun visor.

17. The vehicle visor display of claim 16, wherein the vehicle operational information is received wirelessly from an OBD port on the vehicle.

18. The vehicle visor display of claim 16, wherein the shade member is made of a transflective liquid crystal display extending in parallel with the sun visor member for receiving a video format signal to display a mid-air floating semitransparent image of the vehicle operational and positional information in front of the operator with the aid of an external ambient light filtered through the shade member.

19. The vehicle visor display of claim 18, wherein the shade member is swivel mounted for pivotally mounting the shade member to the sun visor.

20. The vehicle visor display of claim 19, wherein the vehicle operational information is received wirelessly from an OBD port on the vehicle.

* * * * *